United States Patent [19]

Hoff et al.

[11] 4,206,297

[45] Jun. 3, 1980

[54] POLYMERIZATION CATALYSTS AND METHODS

[75] Inventors: Raymond E. Hoff, Palatine; Eugene C. Kenny, III, Oak Lawn, both of Ill.

[73] Assignee: Chemplex Company, Rolling Meadows, Ill.

[21] Appl. No.: 922,670

[22] Filed: Jul. 7, 1978

Related U.S. Application Data

[63] Continuation of Ser. No. 790,827, Apr. 25, 1977, abandoned.

[51] Int. Cl.² .................... C08F 4/78; B01J 21/08
[52] U.S. Cl. .................... 526/106; 252/451; 252/458; 423/338; 423/339; 526/352; 526/905
[58] Field of Search ........... 526/106; 252/451, 458; 423/338, 339

[56] References Cited

U.S. PATENT DOCUMENTS

| | | | |
|---|---|---|---|
| 1,909,008 | 5/1933 | Prange | 423/338 |
| 2,825,721 | 3/1958 | Hogan et al. | 526/106 |
| 3,346,511 | 10/1967 | Hill | 526/106 |
| 3,434,912 | 3/1969 | Peri | 423/338 |
| 3,556,725 | 1/1971 | Chiola et al. | 423/339 |
| 3,850,971 | 11/1974 | Termin et al. | 423/339 |
| 3,862,104 | 1/1975 | Witt | 526/106 |
| 3,948,806 | 4/1976 | Witt | 423/338 |
| 3,960,826 | 6/1976 | Aboutboul et al. | 526/106 |
| 4,006,175 | 2/1977 | Termin et al. | 252/451 |
| 4,041,224 | 8/1977 | Hoff et al. | 526/106 |
| 4,042,770 | 8/1977 | Bachl et al. | 526/106 |

FOREIGN PATENT DOCUMENTS

740055 8/1966 Canada .................... 526/106

*Primary Examiner*—Stanford M. Levin
*Attorney, Agent, or Firm*—Wegner, Stellman, McCord, Wiles & Wood

[57] ABSTRACT

A polymerization catalyst and method which produces substantially pure silica that is uncontaminated with alkali metal or alkaline earth metal ions before associating with the resulting support silica the chromium compound which is either a chromium oxide or a chromium compound convertible to the oxide in the heat activating of the catalyst. In general, the catalyst is prepared by hydrolyzing an organosilicate ester to form suspended silica with the hydrolyzing being catalyzed with an aqueous acid solution containing mixed solvents. Next the resulting liquid is neutralized with an alkali free basic solution such as ammonium hydroxide at controlled low temperature. Then sufficient water is added to permit stirring the resulting gel and this is stirred and heated forming a suspended silica. The silica is then separated and dried, associated with the chromium compound and the mixture then heat activated in the presence of oxygen.

46 Claims, No Drawings

POLYMERIZATION CATALYSTS AND METHODS

This is a continuation of application Ser. No. 790,827 filed Apr. 25, 1977 now abandoned.

BACKGROUND OF THE INVENTION

It is well known that olefins can be polymerized with a catalyst composition comprising a support such as silica with a chromium oxide associated with and carried by the support. These olefins have from 2-8 carbon atoms and are 1-olefins. Also these olefins may be copolymerized with 1-olefins of 2-20 carbon atoms. The catalyst of this invention which uses a substantially pure silica free of alkali metal or alkaline earth metal ions is produced by the hydrolysis of 1 or more orthosilicate esters in a water solution containing mixed solvents and the suspended silica so produced is separated from the liquid and particularly from the water and then associated with a chromium compound that is either a chromium oxide or a compound convertible to an oxide during the processing of the catalyst.

This improved catalyst is useful in the particle form process of polymerizing and copolymerizing olefins and the resulting particle form polyethylene, for example, is of high melt index and improved molecular weight distribution that is suitable for injection molding applications. In addition, the new catalysts of this invention have melt index-temperature dependence different from those of existing catalysts of which we are aware. Furthermore, the catalysts of this invention can be modified by fluoride treatment as taught in U.S. Pat. No. 3,130,188 and when so modified have melt index-temperature dependence different from that of the fluorided catalysts presently available.

In addition, the catalysts of this invention can be used to produce extremely high melt index particle form polyethylene by the method described in the Hoff et al copending application Ser. No. 633,507, filed Nov. 19, 1975, now U.S. Pat. No. 4,041,224 and assigned to the assignee hereof.

SUMMARY OF THE INVENTION

The catalyst of this invention is prepared in a series of steps so that the invention of the catalyst, the method of making the catalyst and the method of polymerizing olefins with the catalyst is dependent on the combination of the series of steps. These steps can each be summarized as follows.

1. An orthosilicate ester is hydrolyzed in water with the hydrolysis being catalyzed with an acidic solution of mixed solvents, the preferred mixture comprising methyl alcohol, water and the acid may be a strong mineral acid such as hydrochloric acid.

2. Next the product of step 1 is converted to a gel by adding an aqueous basic solution that is free of alkali metal or alkaline earth metal ions at a relatively low temperature until the final pH is between about 5.5 and 9.5, the quantities are such that the silica concentration in the gel is about 4-12%, weight/volume.

3. Then sufficient water is added to the gel of the preceding step so that the gel can be stirred and the resulting gel is then stirred and heated at a relatively low temperature for a sufficient period of time for the gel to develop a structure giving the desired surface area and pore size distribution. An example is stirring at 90° C. for 4 hours.

4. Then the liquid is separated from the resulting suspended silica as by filtering and the remaining aqueous liquid is removed from the silica particles by washing the solids with a water miscible solvent which may be methyl alcohol, acetone or the like, followed by drying the silica.

5. To this dried silica is then added a chromium compound such as chromium trioxide or a chromium compound convertible to the oxide in a subsequent heat activating step. This chromium compound may conveniently be added to the dried silica in an organic solvent solution of the chromium compound.

6. The resulting silica-chromium mixture of the preceding step is then heat activated in the customary manner as by heating at an elevated temperature in an oxygen containing atmosphere. A suitable heating temperature has been found to be about 430°-1040° C., while fluidizing with dry air, and preferably at a relatively high temperature of about 930°-1040° C. This heat activating can be by any customary method with one such method being disclosed in the above Hoff et al U.S. Pat. No. 4,041,224. Here, as in the above patent, the mixture may be modified by adding titanium, zirconium, or nickel compounds or a fluoride compound prior to this thermal activation.

DESCRIPTION OF THE PREFERRED EMBODIMENTS

In the preparation of the catalyst and in the methods of this invention the silica before association with the chromium compound is substantially pure and as such is not contaminated by the ions of water soluble compounds such as alkali metal or alkaline earth metals. Such compounds in the past have been found difficult to process as it is difficult to wash water soluble ions from the silica and these have a deleterious effect on the catalytic action of the resulting catalyst and on the polymers that are produced with the catalysts. Thus this invention substantially achieves the ideal situation in which the support or carrier for the catalytically active chromium compound has no extraneous materials and these highly desirable results are obtained by using as the starting silica compound an organic silica compound, preferably an organic silicate ester of which ethyl orthosilicate is an excellent example. By using such organic compounds the residue silica is substantially pure and all remnants of the organic portions of the molecule are driven off by heat.

As mentioned, ethyl orthosilicate is ideally suited for the method of this invention although any lower alkyl silicate may be used. The lower alkyls are considered as those having 1-4 carbon atoms in the radical. Especially suitable is a condensed ethyl silicate commercial product containing about 40 percent silica such as Stauffer Chemical Company's "Silbond 40". Ethyl silicate is miscible with alcohol but almost immiscible with water. However, it is miscible with alcohol containing a small amount of water and in the presence of this water and in a strong acid solution is rapidly hydrolyzed during which it becomes increasingly miscible with larger amounts of water. Thus the hydrolysis proceeds. However, under conditions of low pH the tendency to form a gel is slight.

In a more specific process of this invention, the lower alkyl orthosilicate is added to a mixture of a water miscible lower alkanol and an aqueous acid solution. Then after a hydrolysis period of from five minutes to two hours, the solution is substantially neutralized by adding an aqueous alkali free basic solution, such as dilute aqueous ammonia or guanidine carbonate. The resulting mixture is neutralized in this step to a final pH of about 4–10 and preferably of about 5.5–9.5 being especially preferred. Under these conditions gelation occurs in a relatively short time. The liquids are controlled in quantity so that the silica concentration after this neutralizing is about 4–12% weight/volume. It is also preferred that the basic solution be added to the hydrolyzed ethyl silicate at a rate such that the final pH is obtained in about an hour, and that during the addition the mixture be kept at a low temperature such as about 10° C.

After the neutralizing step enough water is added to the resulting gel so that the composition can be stirred and this composition is then stirred and heated at a relatively low temperature until the gel attains a catalytically desirable surface area and pore size distribution. A good example of this is heating at about 90° C. for about 4 hours.

Following the aging of the gel the silica solids are separated from the liquid as by filtering and the remaining water is removed by washing the solids with a water miscible solvent such as a low alkyl alcohol, a lower ketone or the like of which methyl alcohol and acetone are good examples. By using higher temperatures in the solvent removal of water other solvents may of course be used including aliphatic esters, higher aliphatic ketones and higher aliphatic alcohols.

After displacement of the water by the water miscible solvent the residual solvent can be removed by heating. The silica gel which results is completely free of adsorbed ions such as sodium which are known to inhibit catalytic activity and which are almost impossible to remove by washing. Thus it is believed that the superiority of the catalysts of this invention is dependent on the substantially complete absence of such foreign ions. The desirable pore structure and surface area produced by the sequence of steps of this invention can be retained at higher than usual thermal activation temperatures because of the absence of such ions.

According to this invention, the catalytic composition contains an effective catalytic amount of chromium oxide, a portion of which preferably contains at least some chromium in the hexavalent state. The amount of chromium present can be in the range of from about 0.1 to about 50 weight percent as chromium based on the total weight of the catalytic composition, and the amount of hexavalent chromium present should be at least 0.1 weight percent based on the total weight of the catalytic composition.

The thus-formed catalytic composition is then activated by heating in the above-disclosed temperature ranges for at least one minute, preferably from about 1 minute to about 48 hours, while in contact with the above-described activating gas. The activating gas can contain a substantially inert portion and an oxidizing portion, the substantially inert portion being substantially inert to the oxidizing portion of the gas and to the catalytic composition with which the gas is in contact. The substantially inert portion of the activating gas can be composed of at least one of carbon dioxide, nitrogen, helium, neon, argon, krypton and xenon. The oxidizing portion of the activating gas can be composed of at least one of atomic oxygen, ozone, molecular oxygen and air. It is preferred that the activating gas be relatively dry, i.e., contain less than 5 parts per million of water.

The following examples illustrate the invention.

EXAMPLES 1–3

A quantity of Stauffer Chemical Company "Silbond 40" was added by drops to an acid solution at room temperature over a period of 60 minutes. The acid solution was prepared by mixing 175 ml methyl alcohol, 350 ml deionized water and 24.5 ml concentrated hydrochloric acid. The mixture was constantly stirred during the addition of the "Silbond 40". The stirring was continued for an additional 80 minutes. The mixture was then cooled to 10° C. and an aqueous guanidine carbonate solution was added at a constant rate over two hours so that the pH changed from 0.82 to 6.75. At this point, the concentration of silica was about 8%. After 25 minutes at a pH of 6.75 and 10° C. the mixture gelled. 600 ml of deionized water was added, the gel was broken up and the pH was adjusted to 5.5 by the addition of hydrochloric acid. The resulting slurry was heated to 90° C. and maintained at this temperature for one hour. It was removed from the heat for 17 hours and aged for an additional 2.5 hours at 90° C. after this waiting period. The slurry was then filtered and the separated gel was immediately mixed with 900 ml methyl alcohol. The mixture was stirred for 30 minutes and the gel was again separated by filtration. The extraction step was repeated with 900 ml acetone. The recovered gel was then immediately dried on a hot plate to remove the acetone. The yield was 39.6 grams. The material was lightly crushed and sieved and the portion in the size range of 44 to 297 microns was saved. This portion weighed 37 grams.

Portions of the silica were heated in air fluidization at 650° C. and then mixed with chromium compounds. The catalysts of Examples 1, 2 and 3 were made by melt coating 2 weight percent chromium trioxide on the silica followed by activating in air. The catalysts were tested in particle form ethylene polymerization in isobutane at a constant pressure of 550 psig with the following results:

| Exam. No. | Activation T °C. | Polymerization T °C. | Melt Index* | Reactivity g/g cat/hr | Productivity g/g cat |
|---|---|---|---|---|---|
| 1 | 800 | 110 | 2.6 | 1970 | 1970 |
| 2 | 870 | 110 | 2.5 | 2360 | 2560 |
| 3 | 970 | 110 | 4.7 | 2400 | 2140 |

*ASTM D 1238-65T Condition E

The high melt index and good reactivity for the catalyst activated at 970° C. show the thermal stability of the silica.

EXAMPLES 4–6

The catalysts of Examples 4–6 were made by adding to the silica of Examples 1–3 0.5 weight percent chromium in the form of t-butyl chromate in benzene. These catalysts were also activated in air and tested in particle form polymerization as described above. The results below indicate that at still higher activation temperatures the shear sensitivity of the product polyethylene increases. This is indicated by the increase in the ratio of the high load to normal melt index:

| Exam. No. | Activation T° C. | Polymerization T° C. | Melt Index* | High Load Melt Index** | Reactivity g/g cat/hr |
|---|---|---|---|---|---|
| 4 | 955 | 105 | 0.28 | 27 | 3090 |
| 5 | 1000 | 105 | 0.16 | 29 | 2760 |

-continued

| Exam. No. | Activation T° C. | Polymerization T° C. | Melt Index* | High Load Melt Index** | Reactivity g/g cat/hr |
|---|---|---|---|---|---|
| 6 | 1025 | 105 | 0.03 | 8.1 | 2630 |

*ASTM D 1238-65T Condition E
**ASTM D 1238-65T Condition F

EXAMPLES 7-8

The Example 3 catalyst and the Example 4 catalyst were again tested in particle form polymerization as described in Example 1 except that hydrogen was added at the beginning of the polymerization reaction. Hydrogen to cause a 50 psig increase in pressure was added along with ethylene to make up the total pressure to 550 psig. During the reaction, the pressure was maintained by the addition of ethylene only. Under these conditions, the catalysts yielded the following:

| Exam. No. | Polymerization Temp. °C. | Reactivity g/g cat/hr | Productivity g/g cat | Melt Index |
|---|---|---|---|---|
| 7 | 110 | 1800 | 1940 | 6.3 |
| 8 | 110 | 1900 | 2850 | 6.3 |

High density polyethylene with a melt index of 6 is suitable for many injection molding applications.

EXAMPLE 9

Silica prepared as described in Examples 1-3 was fluidized with dry air and heated to 650° C. for 1 hour. Upon cooling to room temperature, it was mixed with 2.3 wt.% ammonium fluorosilicate and 0.5 wt.% chromium in the form of t-butyl chromate dissolved in benzene. The mixture was activated in dry air in a fluidized bed at 610° C. A portion of the activated catalyst was tested in particle form polymerization as described in Examples 1-3:

| Polymerization Temp. °C. | Melt Index | High Load Melt Index | Reactivity g/g cat/hr | Productivity g/g cat |
|---|---|---|---|---|
| 110 | 0.44 | 19.8 | 1910 | 2390 |

EXAMPLE 10

Silica prepared as described in Examples 1-3 was heated in dry air at 650° C. A catalyst was then prepared from it according to the method described in the aforementioned Hoff et al application 633,507. 0.5 wt.% chromium was again added as t-butyl chromate and the benzene solvent was driven off by heating at 180° C. with nitrogen fluidization. Titanium tetraisopropoxide was added to the fluidized bed to give 4.2 wt.% titanium and then the material was activated in a flowing stream of one volume percent carbon monoxide in nitrogen at 705° C. After this activation, the catalyst was cooled to 540° C. and treated with air for 15 minutes after closing off and purging out the carbon monoxide. The catalyst was then kept fluidized with pure nitrogen during additional cooling to 235° C. A portion of the activated catalyst was tested in particle form polymerization as described in Examples 1-3:

| Polymerization Temp. °C. | Reactivity g/g cat/hr | Productivity g/g cat | Melt Index |
|---|---|---|---|
| 105 | 2090 | 2090 | 29 |

The very high melt index shows that the silica of this invention is suitable for use in the method described in the above patent application.

EXAMPLE 11

60 ml (52 grams) of tetraethyl silicate solution containing 28.8% $SiO_2$ was added to 100 ml methanol and an acid solution containing 7 ml concentrated hydrochloric acid and 200 ml water. This mixture was heated to 45° C. within 10 minutes and maintained at this temperature for 30 minutes under vigorous agitation. It was then cooled to 5° C. and 32 ml of a solution containing 11.2 grams of guanidine carbonate in water was added slowly over a two hour period.

At this point, the slurry set up in a hard gel. The final pH was about 7.6. 200 ml of deionized water was added to the gel and the gel was broken up. It was then heated to 85° C. within 40 minutes and this temperature was maintained for 1½ hours. During the heating, an additional 130 ml of deionized water was added to replace the evaporated solvent. The slurry was kept at room temperature overnight after the aging at 85° C. On the following day, the slurry was filtered, then mixed with 300 ml methanol, and homogenized for 15 minutes. This slurry was filtered, then mixed with 300 ml acetone and again homogenized for 15 minutes. Finally, the gel was filtered and heated on an aluminum dish on a hot plate for 2 hours at 60° C. to remove the remaining acetone.

The silica product was sieved and only that portion between 44-297 microns was retained. This fraction of the silica was placed in an activation tube and calcined at 651° C. for 1 hour under air at the rate of 300 cc/minute. The calcined silica was then cooled to room temperature and blended with a solution of t-butyl chromate to give 0.5 wt.% chromium. It was put back into the activation tube and heated to 170° C. under nitrogen at the rate of 300 cc/min. This temperature was held for 10 minutes after which 4.2% titanium tetraisopropoxide was syringed onto the silica. The combination was then activated at 700° C. for five hours and forty minutes under 1% carbon monoxide and 99% nitrogen. The total flow rate was 300 cc/minute. It was then cooled to 500° C. and, after purging the carbon monoxide from the activator for 30 minutes, was given a 15 minute air treatment at 300 cc/min. The excess air was then purged from the activator for 30 minutes with nitrogen. The catalyst was cooled to 230° C. over a period of one hour. The catalyst was placed in a transfer flask under nitrogen, taking all precautions to eliminate air and water.

This catalyst was used to polymerize ethylene in the particle form process. A 0.1165 gram charge was put into a 1 liter batch reactor using isobutane as a diluent. The reaction temperature was about 105° C. The results are below:

| Reactivity g/g cat/hr | Melt Index | High Load Melt Index |
|---|---|---|
| 1530 | 0.92 | 101 |

EXAMPLE 12

This example shows the poor catalysts which result when silica xerogel is made from ethyl silicate by procedures different from those of this invention.

A 52 gram quantity of tetraethyl silicate was mixed with 100 ml methyl alcohol and a solution of 7 ml concentrated hydrochloric acid in 100 ml of water. The combination was stirred and heated at about 70° C. for 30 minutes. At the end of the 30 minutes, a solution of 6 grams quanidine carbonate in 20 ml water was added quickly with rapid stirring. After 2 minutes, the mixture formed a firm gel. The temperature of the reaction mixture after the addition of the guanidine carbonate solution was 48° C. The gel was aged at room temperature for three days. It was then mixed with 500 ml water, broken up, and stirred for one hour. The hydrogel was filtered out. It was extracted first with 400 ml methanol, then 300 ml acetone, and finally soaked in another 300 ml acetone overnight.

The gel was filtered from the acetone and dried on a hot plate at 150° C. The material was ground with mortar and pestle and the ground silica was separated into different particle sizes by means of standard sieves. An 8 gram quantity of the silica having particles in the range of 44 to 420 microns was mixed with t-butyl chromate benzene solution to give 0.5 wt.% chromium. The catalyst was activated as described in Example 11 with titanium addition, nitrogen-carbon monoxide mixture fluidization, and air treatment. A polymerization test was conducted as described in Example 11. The result shows the catalyst to have low reactivity and an undesirable induction period.

| Catalyst Wt. (g) | Induction Time (Minutes) | Reactivity g/g cat/hr |
|---|---|---|
| .3985 | 19 | 250 |

EXAMPLES 13–15

Additional silicas, Examples 13–15, were also prepared. The silica of Example 13 was prepared similarly to the silica of Example 12 except that 50 ml of water was mixed with the 7 ml of concentrated hydrochloric acid, the aging time of the gel was 2 hours, and the gel was soaked in acetone. The polymerization tests again showed low reactivity and an induction period. The silica of Example 14 was made from 52 grams ethyl silicate, 100 ml methyl alcohol and 7 ml concentrated hydrochloric acid in 200 ml water. The gel was aged and washed as in Example 12. Part of the dried gel was calcined in air at 1200° F. before addition of the chromium. This portion is the silica of Example 15. All of the materials were thermally activated as in Example 12.

Polymerization tests gave the following:

| Exam. No. | Catalyst Wt. (g) | Induction Time (Minutes) | Reactivity g/g cat/hr |
|---|---|---|---|
| 13 | 0.3953 | 15 | 210 |
| 14 | 0.6513 | 18 | 250 |
| 15 | 0.3820 | 40 | 190 |

EXAMPLE 16

Another silica was prepared in a way similar to Example 11. A 52 gram quantity of tetraethyl silicate was added to 50 ml of methanol and an acid solution containing 7 ml concentrated hydrochloric acid and 100 ml water. The mixture was heated to 45° C. for thirty minutes under agitation and then cooled to 5° C. Guanidine carbonate solution was added as in Example 11 to a pH of 6.7. At this pH, the addition of guanidine carbonate solution was stopped. After twenty minutes, the mixture formed a firm gel. The gel was then broken up and 200 ml water was added to it. The pH of the slurry was lowered to 5.5 with a 10% hydrochloric acid solution in water. The remainder of the preparation was identical to Example 11 except that the activation temperature of the catalyst in the nitrogen-carbon monoxide mixture was 800° C. instead of 700° C.

After activation, the catalyst was used to polymerize ethylene in a particle form process. A 0.0848 gram charge was put into a 1 liter batch reactor. The temperature was maintained at 105° C. The polymerization results are as follows:

| Reactivity g/g cat/hr | Melt Index |
|---|---|
| 1520 | 5.5 |

EXAMPLE 17

Another silica was produced similar to Example 16 except that the pH was 5.5 when the gel formed. The gel took 1.5 hours to form. The aging process, extraction of water and activation were substantially identical to Example 16. The activation temperature of the catalyst in the nitrogen-carbon monoxide mixture was 700° C.

This catalyst was also used to polymerize ethylene. The polymerization results are as follows:

| Catalyst Wt. (g) | Reactivity g/g cat/hr | Melt Index |
|---|---|---|
| 0.0919 | 1410 | 2.0 |

EXAMPLES 18–19

In these examples, another silica was produced similar to Example 16. In this preparation, the initial acid solution of tetraethyl silicate, water and methanol was heated to 45° C. and maintained there for 2 hours. The remainder of the preparation was the same.

This catalyst was then tested in the polyethylene particle form process. The results are given below:

| Exam. No. | Catalyst Wt. (g) | Reactivity g/g cat/hr | Melt Index |
|---|---|---|---|
| 18 | .0908 | 1380 | |
| 19 | .0723 | 3280 | 2.5 |

EXAMPLE 20

A silica gel was prepared substantially as described in Example 16 except for the way in which the ethyl silicate was mixed with the methyl alcohol and water. In this case, ethyl silicate was added dropwise over a period of an hour to a rapidly stirred mixture of water, methyl alcohol and concentrated hydrochloric acid. During this addition, the reaction mixture was kept at room temperature. The remainder of the activation and preparation was as in Example 16 except that the activation temperature was 700° C. instead of 800° C. The polymerization test gave the following result:

| Catalyst Wt. (g) | Reactivity g/g cat/hr | Melt Index |
| --- | --- | --- |
| .0906 | 2520 | 4.4 |

Having described our invention as related to the embodiments set out herein, it is our intention that the invention be not limited by any of the details of description, unless otherwise specified, but rather be construed broadly within its spirit and scope as set out in the appended claims.

We claim:

1. A catalyst for use in polymerizing 1-olefins comprising an improved substantially pure wide pore silica support with enhanced thermal stability and chromium oxide associated with said support, said catalyst being prepared by
    (1) hydrolyzing an organosilicate ester with an aqueous acid solution containing a water soluble aliphatic alcohol,
    (2) neutralizing the product of (1) to a final pH of about 5.5–9.5 by adding an aqueous basic solution free of alkali metal at a slow rate so that the final pH is obtained at the end of a two hour period and at a temperature of 5° C. thereby forming a gel, the amount of liquids in said gel being controlled to give a resulting silica concentration in said gel of about 4–12 grams of said silica per hundred milliliters of said gel,
    (3) then adding sufficient water to the gel of (2) to permit stirring the gel and then stirring and heating the gel, separating the resulting suspended silica from the liquid and washing the separated solids with a water miscible solvent followed by drying the said silica solids to produce said improved support,
    (4) then adding to said dried solids support a chromium compound in a non-aqueous medium or by dry blending, said compound comprising either a chromium oxide or a chromium compound oxidizable to an oxide when heat activated in the presence of oxygen, and
    (5) heat activating the silica-chromium mixture of (4) by heating at about 430°–1040° C. in an oxidizing atmosphere.

2. The catalyst of claim 1 wherein said ester is an alkyl ester of 1–4 carbon atoms.

3. The catalyst of claim 2 wherein said ester comprises ethyl orthosilicate and wherein said aqueous acid solution comprises a strong mineral acid.

4. The catalyst of claim 1 wherein said heat activating of (5) is at a temperature of about 930°–1040° C.

5. The catalyst of claim 1 wherein said basic solution comprises ammonium hydroxide.

6. The catalyst of claim 1 wherein said basic solution comprises guanidine carbonate.

7. The catalyst of claim 1 wherein said ester is an alkyl ester of 1–4 carbon atoms, said ester comprises ethyl orthosilicate and wherein said aqueous acid solution comprises a strong mineral acid and said basic solution comprises ammonium hydroxide.

8. The catalyst of claim 1 wherein said ester is an alkyl ester of 1–4 carbon atoms, said ester comprises ethyl orthosilicate and wherein said aqueous acid solution comprises a strong mineral acid and said basic solution comprises guanidine carbonate.

9. The catalyst of claim 1 wherein said stirring of the gel is at a temperature of about 25°–90° C. for about one to ten hours.

10. The catalyst of claim 1 wherein the water of (3) is removed by washing the solids with a member of the group consisting of lower alkyl alcohols, lower alkyl ketones and mixtures thereof.

11. The catalyst of claim 1 wherein said chromium compound of step (4) comprises chromium oxide in an effective catalytic amount in the range of about 0.1–50 wt.% based on the total weight of the catalyst is hexavalent chromium.

12. The catalyst of claim 11 wherein said heat activating of step (5) is at a temperature of about 930°–1040° C.

13. The catalyst of claim 1 wherein said hydrolyzing of step (1) is with a mixture comprising methyl alcohol, hydrochloric acid and water.

14. The catalyst of claim 1 wherein said ester comprises ethyl orthosilicate and said solution comprises methyl alcohol, water and hydrochloric acid.

15. The catalyst of claim 14 wherein said stirring and heating of step (3) is at a temperature of about 90° C. for about 4 hours.

16. The catalyst of claim 1 wherein said chromium compound comprises a lower alkyl chromate.

17. The method of making a catalyst for use in polymerizing 1-olefins comprising an improved substantially pure wide pore silica support with enhanced thermal stability and chromium oxide associated with said support, said method comprising:
    (1) hydrolyzing an organosilicate ester with an aqueous acid solution containing a water soluble aliphatic alcohol,
    (2) neutralizing the product of (1) to a final pH of about 5.5–9.5 by adding an aqueous basic solution free of alkali metal at a slow rate so that the final pH is obtained at the end of a two hour period and at a temperature of 5° C. thereby forming a gel, the amount of liquids in said gel being controlled to give a resulting silica concentration in said gel of about 4–12 grams of said silica per hundred milliliters of said gel,
    (3) then adding sufficient water to the gel of (2) to permit stirring the gel and then stirring and heating the gel, separating the resulting suspended silica from the liquid and washing the separated solids with a water miscible solvent followed by drying the said silica solids to produce said improved support,
    (4) then adding to said dried solids support a chromium compound in a non-aqueous medium or by dry blending, said compound comprising either a chromium oxide or a chromium compound oxidizable to an oxide when heat activated in the presence of oxygen, and
    (5) heat activating the silica-chromium mixture of (4) by heating at about 430°–1040° C. in an oxidizing atmosphere.

18. The method of claim 17 wherein said ester is an alkyl ester of 1–4 carbon atoms.

19. The method of claim 18 wherein said ester comprises ethyl orthosilicate and wherein said aqueous acid solution comprises a strong mineral acid.

20. The method of claim 17 wherein said heat activating of (5) is at a temperature of about 930°–1040° C.

21. The method of claim 17 wherein said basic solution comprises ammonium hydroxide.

22. The method of claim 17 wherein said basic solution comprises guanidine carbonate.

23. The method of claim 17 wherein said ester is an alkyl ester of 1-4 carbon atoms, said ester comprises ethyl orthosilicate and wherein said aqueous acid solution comprises a strong mineral acid and said basic solution comprises ammonium hydroxide.

24. The method of claim 17 wherein said ester is an alkyl ester of 1-4 carbon atoms, said ester comprises ethyl orthosilicate and wherein said aqueous acid solution comprises a strong mineral acid and said basic solution comprises guanidine carbonate.

25. The method of claim 17 wherein said stirring of the gel is at a temperature of about 25°–90° C. for about one to ten hours.

26. The method of claim 17 wherein the water of (3) is removed by washing the solids with a member of the group consisting of lower alkyl alcohols, lower alkyl ketones and mixtures thereof.

27. The method of claim 18 wherein said chromium compound of step (4) comprises chromium oxide in an effective catalytic amount in the range of about 0.1–50 wt.% based on the total weight of the catalyst and at least about 0.1 wt.% based on the total weight of the catalyst is hexavalent chromium.

28. The method of claim 27 wherein said heat activating of step (5) is at a temperature of about 930°–1040° C.

29. The method of claim 17 wherein said hydrolyzing of step (1) is with a mixture comprising methyl alcohol, hydrochloric acid and water.

30. The method of claim 17 wherein said ester comprises ethyl orthosilicate and said solution comprises methyl alcohol, water and hydrochloric acid.

31. The method of claim 30 wherein said stirring and heating of step (3) is at a temperature of about 90° C. for about 4 hours.

32. The method of claim 17 wherein said chromium compound comprises a lower alkyl chromate.

33. The method of making polymers of 1-olefins of 2-8 carbon atoms and copolymers of said olefins and 1-olefins of 2-20 carbon atoms which comprises polymerizing said olefins under polymerizing conditions with the catalyst of claim 1.

34. The method of making polymers of 1-olefins of 2-8 carbon atoms and copolymers of said olefins and 1-olefins of 2-20 carbon atoms which comprises polymerizing said olefins under polymerizing conditions with the catalyst of claim 2.

35. The method of making polymers of 1-olefins of 2-8 carbon atoms and copolymers of said olefins and 1-olefins of 2-20 carbon atoms which comprises polymerizing said olefins under polymerizing conditions with the catalyst of claim 3.

36. The method of making polymers of 1-olefins of 2-8 carbon atoms and copolymers of said olefins and 1-olefins of 2-20 carbon atoms which comprises polymerizing said olefins under polymerizing conditions with the catalyst of claim 4.

37. The method of making polymers of 1-olefins of 2-8 carbon atoms and copolymers of said olefins and 1-olefins of 2-20 carbon atoms which comprises polymerizing said olefins under polymerizing conditions with the catalyst of claim 5.

38. The method of making polymers of 1-olefins of 2-8 carbon atoms and copolymers of said olefins and 1-olefins of 2-20 carbon atoms which comprises polymerizing said olefins under polymerizing conditions with the catalyst of claim 6.

39. The method of making polymers of 1-olefins of 2-8 carbon atoms and copolymers of said olefins and 1-olefins of 2-20 carbon atoms which comprises polymerizing said olefins under polymerizing conditions with the catalyst of claim 7.

40. The method of making polymers of 1-olefins of 2-8 carbon atoms and copolymers of said olefins and 1-olefins of 2-20 carbon atoms which comprises polymerizing said olefins under polymerizing conditions with the catalyst of claim 8.

41. The method of making polymers of 1-olefins of 2-8 carbon atoms and copolymers of said olefins and 1-olefins of 2-20 carbon atoms which comprises polymerizing said olefins under polymerizing conditions with the catalyst of claim 9.

42. The method of making polymers of 1-olefins of 2-8 carbon atoms and copolymers of said olefins and 1-olefins of 2-20 carbon atoms which comprises polymerizing said olefins under polymerizing conditions with the catalyst of claim 10.

43. The method of making polymers of 1-olefins of 2-8 carbon atoms and copolymers of said olefins and 1-olefins of 2-20 carbon atoms which comprises polymerizing said olefins under polymerizing conditions with the catalyst of claim 11.

44. The method of making polymers of 1-olefins of 2-8 carbon atoms and copolymers of said olefins and 1-olefins of 2-20 carbon atoms which comprises polymerizing said olefins under polymerizing conditions with the catalyst of claim 12.

45. The method of making polymers of 1-olefins of 2-8 carbon atoms and copolymers of said olefins and 1-olefins of 2-20 carbon atoms which comprises polymerizing said olefins under polymerizing conditions with the catalyst of claim 13.

46. The method of making polymers of 1-olefins of 2-8 carbon atoms and copolymers of said olefins and 1-olefins of 2-20 carbon atoms which comprises polymerizing said olefins under polymerizing conditions with the catalyst of claim 14.

* * * * *